United States Patent [19]

Battistone

[11] 4,443,176
[45] Apr. 17, 1984

[54] FOOD MOLD

[76] Inventor: Nick Battistone, 25271 Chardon Rd., Richmond Heights, Ohio 44143

[21] Appl. No.: 302,795

[22] Filed: Sep. 16, 1981

[51] Int. Cl.³ .......................... B29C 7/00; A23G 9/04
[52] U.S. Cl. ...................................... 425/276; 30/130; 249/66 R; 425/438
[58] Field of Search ............... 249/66 R, 68; 425/276, 425/276, 405, 438, 444; 30/130

[56] References Cited

U.S. PATENT DOCUMENTS

| | | | |
|---|---|---|---|
| 35,393 | 5/1862 | Ridout | 425/276 |
| 126,641 | 5/1872 | Mabbitt | 425/276 |
| 351,042 | 10/1886 | Carver | 425/276 |
| 423,478 | 3/1890 | Kimball | 425/276 |
| 496,635 | 5/1893 | Brenneisen | 425/276 |
| 3,495,488 | 2/1970 | Addis et al. | 30/130 |
| 3,695,572 | 10/1972 | Jullien-Davin | 249/68 |
| 3,760,499 | 9/1973 | Crain, Jr. | 30/130 |

FOREIGN PATENT DOCUMENTS 132048  8/1978  Fed. Rep. of Germany ...... 425/276

Primary Examiner—Willard E. Hoag
Attorney, Agent, or Firm—Watts, Hoffmann, Fisher & Heinke

[57] ABSTRACT

A food mold having a rectangular body having sides and an upper mounting plate is disclosed. A dislodging plate is disposed within the body in a plane parallel with the mounting plate. A central shaft is connected to the dislodging plate and extends upward above the mounting plate. The shaft is positioned within an encircling depth control means. The depth control includes a sleeve in communication with the mounting plate and which contains depth indicators whereby a projection on the central shaft engages the desired depth indicator and controls the depth of the mold. A depth control selector is connected to the central shaft to rotate it so the projection engages the desired depth indicator.

8 Claims, 7 Drawing Figures

FOOD MOLD

DESCRIPTION

TECHNICAL FIELD

The present invention relates to an apparatus and method for making and molding foods of a desired depth. More specifically the apparatus of the present invention relates to a mold which is principally intended for shaping ice cream for sandwiches but also useful for shaping ground meat, potatoes and other similar foods into desired shapes and thicknesses and dislodging them from the mold.

BACKGROUND ART

In preparing foods, for both home and restaurant consumption, it is desirable to form foods into various shapes and thicknesses. In order to produce molded foods it is necessary to have a device which is simple to use as well as versatile and efficient.

One piece food molds comprised of rigid materials are well known. Molds of this type are limited in the types and shapes of finished products that can be produced. Generally food molds intended for home or other low volume use are not adjustable and cannot be readily modified to suit each individual use. Typically the finished food products produced with one of these molds are all the same shape and thickness. It is particularly advantageous to have a mold where the depth can be modified to adapt to each particular use. Numerous examples exist where it is beneficial to modify the depth of the mold. Some of these examples include forming: ice cream sandwiches, meat patties, and potato patties.

In preparing such foods, it is also desirable that the mold contain some type of dislodging device to remove the molded food from the mold without deformation. Proposals for food molds utilizing pins, plates and movable inner cups have been suggested for this purpose. Usually, these proposed devices would have been unable to dislodge the foods satisfactorily and efficiently without altering the finished shape.

DISCLOSURE OF THE INVENTION

The present invention provides a new and improved apparatus and method for preparing molded foods of various thicknesses. In the preferred embodiment, the apparatus is comprised of a transparent plastic outer body having sides and an upper mounting plate. A dislodging plate is disposed within the outer body in a plane parallel with the mounting plate. A depth controller extends upward and around a central axis and includes a sleeve containing a series of depth indicators which correspond to various depths of the mold. The depth controller is mounted on the mounting plate. A central shaft is in communication with the dislodging plate and the depth controller. The shaft carries a pin which projects radially outwardly and selectively engages the desired one of the depth indicators when the shaft is rotated inside the depth control means. A depth control selector surrounds the sleeve of the depth controller and rotates the central shaft so that the pin on the shaft engages the desired depth indicator.

The food mold of this invention has a molding cavity which is a rectangular solid. This configuration is ideal for making ice cream sandwiches. It is also ideal for molding foods for storage in a home freezer or the like because the rectangular configuration permits stacking and close juxtaposition of molded foods thus maximizing the quantity of food that can be stored in a given volume.

Preferably, the invention as employed in the preferred embodiment is constructed from transparent acrylic which enables the operator of the device to visually observe the depth selected. The dislodging plate can be adjusted to a plurality of depths depending upon the food thickness desired. The shape of the outer body member can be varied.

BEST MODE FOR CARRYING OUT THE INVENTION

Figure 1:
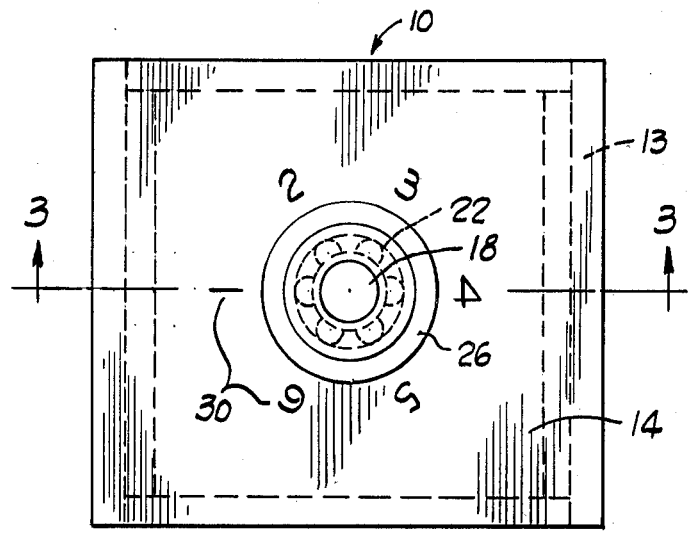
FIG. 1 is a top plan view of the food molding device in accordance with the preferred embodiment of the invention.
Figure 2:
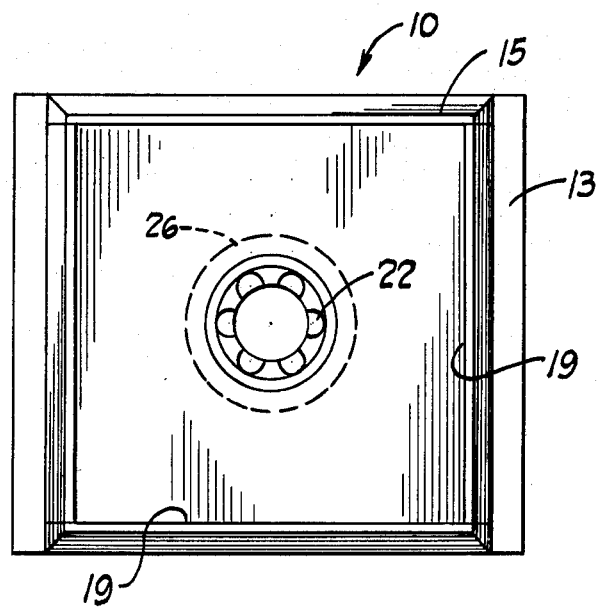
FIG. 2 is a bottom view of the same with the dislodging plate and central shaft removed for clarity.
Figure 3:
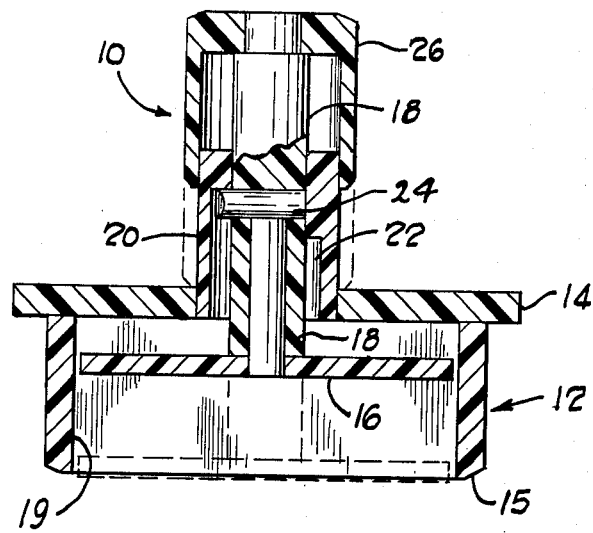
FIG. 3 is a cross sectional view of the same as seen from the plane indicated by the line 3—3 of FIG. 1.
Figure 4:
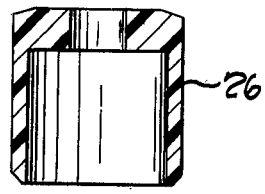
FIG. 4 is a sectional view on an enlarged scale of the depth control selector in detail.
Figure 5:
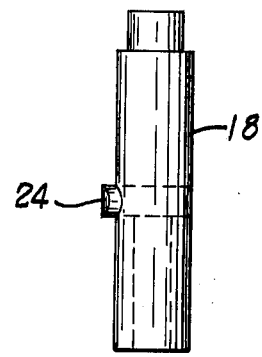
FIG. 5 is an elevational view on the scale of FIG. 4, of the central shaft of the food molding device.
Figure 7:
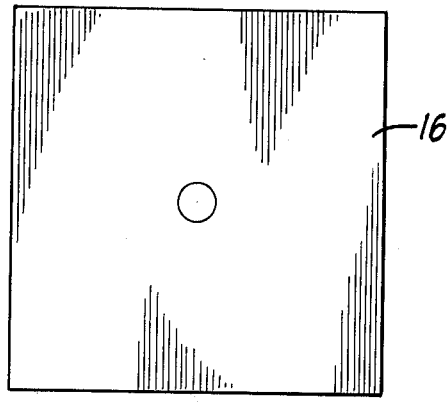
Figure 6:
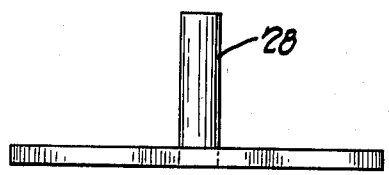
FIG. 6 is a side view of the dislodging plate with its shaft extension extending upward; and, FIG. 7 is a top plan view of the plate and shaft of FIG. 6.

Referring to FIGS. 1 to 3, the food molding device is shown generally at 10. The device includes a body 12 comprised of side members 13 and an upper mounting plate 14. In the preferred embodiment, the outer body member is comprised of transparent plastic of approximately ¼" thickness. Lower portions of outer surfaces of the side members are beveled at 15 to provide a thin bottom surface and therefore facilitate molding and cutting.

A dislodging plate 16 is disposed within the body 12 and is parallel with the upper mounting plate 14. In the preferred and disclosed embodiment the dislodging plate 16 is square and of a size corresponding to that of commercial graham crackers. The body 12 has smooth inner walls 19 which define a square food, cavity of uniform cross section from top to bottom. The walls 19 and the dislodging plate 16 are complementally contoured so that the plate functions as a non-rotatable piston.

The dislodging plate 16 is connected to a central shaft 18 of the device. The dislodging plate 16 can be moved upward and downward relative to the mounting plate 14 by a depth selector 26. In operation, the placement of the dislodging plate 16 within the outer body member 12 determines the depth of the finished food product.

A depth controller 20 is in communication with the mounting plate 14 and extends above the mounting plate. The depth controller is immovably secured to the mounting plate 14. In the preferred embodiment, the depth controller 20 is comprised of a sleeve surrounding the central shaft 18. On the inner surface of the sleeve of the depth controller, facing the central shaft 18, are longitudinal grooves 22 bored into the sleeve. Each of the grooves 22 is of a different length than the other so that each provides a different depth that can be selected. The uppermost portion of each of these grooves acts as a stop. When the shaft 18 is rotated so that a projection 24 on the shaft is aligned with one one of the grooves and the depth control selector 26 is raised, the projection will come into contact with the top of the groove and will be stopped. In the preferred embodiment, numbers 30 corresponding to the grooves, are printed on the mounting plate. For example, the number 6 on the mounting plate corresponds to the longest groove and that selection will produce the thickest food products.

The central shaft 18 extends from the dislodging plate 16 upward above the depth controller 20. The dislodging plate 16 is connected with the central shaft 18 by a shaft extension 28 extending from the dislodging plate into the shaft. Approximately one-third up from the mounting plate, the central shaft carries a pin which forms the projection 24. The projection engages one of the grooves 22 in the depth controller and locates the dislodging plate at the desired depth. The central shaft 18 is rotatable within the depth controller so that the desired depth can be selected.

Surrounding the depth controller is a depth control selector 26. The depth control selector is friction fitted to the central shaft and rotates the central shaft inside the depth controller. In the preferred embodiment, the depth selector is comprised of plastic and is knob shaped. In addition, the depth selector may contain some type of indicia, such as an arrow, printed on the selector which indicates the orientation of the projection 24. The indicia facilitates the depth selection. By aligning the arrow with one of the numbers 30 on the mounting plate, the desired depth can be selected. FIG. 3 illustrates the depth selector 26 surrounding the depth control 20.

In operation, the desired food depth is selected by aligning the indicia on the depth selector with a number on the mounting plate. The selector and plate are raised to the selected position such as the position shown in solid lines in FIG. 3. The molding device is then inverted and the food to be molded is placed within the body 12. Pressure may then be applied to the mold so that the food will conform to the shape of the mold. This can be done by pressing the mold against a flat surface and exerting a slight downward force on the depth selector which will cause the dislodging plate to be pressed against the food or by using a spatula with the mold inverted. Excess food is removed and the food may then be dislodged by pushing downward on the depth selector which will cause the dislodging plate to be lowered to the phantom line position to dislodge the food.

In making an ice cream sandwich, the depth selector is first placed in a desired position. A graham cracker or other cookie is placed in the food cavity and on the dislodging plate. The cavity is then filled with ice cream and the depth selector is depressed to dislodge the cracker and ice cream onto another cracker to complete the sandwich.

The foregoing is considered as illustrative of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

I claim:

1. A food molding and dislodging device comprising:
(a) an outer body structure, having sides and an upper mounting plate;
(b) a dislodging plate disposed within said outer body member in a plane parallel with the top of said mounting plate and movable upward and downward relative to the outer body member;
(c) a depth controller extending upward and above said mounting plate said depth controller having a plurality of grooves, each of said grooves being of differing length; and,
(d) a depth control selector in communication with the dislodging plate and wherein said depth control selector is rotatable around a central axis to selectively position said dislodging plate in communication with one of said grooves, the dislodging plate being positioned at a depth within the outer body member defined by the length of the groove in selected communication.

2. A food molding and dislodging device comprising:
(a) a rectangular outer body structure, having sides and an upper mounting plate;
(b) a dislodging plate disposed within said outer body member in a plane parallel with the mounting plate and in communication with a central axis;
(c) a central shaft having a projection and in communication with the dislodging plate and extending upward above the mounting plate and positioned within a depth control means;
(d) a depth control means extending upward and encircling the central shaft and wherein said depth control means further comprises a sleeve in communication with the mounting plate and which contains depth indicators whereby said projection on the central shaft engages the desired depth indicator and modifies the depth of the mold;
(e) a depth control selector rotatable around the outer edge of the depth control means and which is in communication with the central shaft and rotates the central shaft so that said projection engages the desired depth indicator.

3. An apparatus for shaping food which comprises:
(a) a rigid outer body structure comprising sides and an upper mounting plate;
(b) a dislodging means disposed within said outer body member in a plane parallel with the top of the mounting plate and which is movable upward and downward relative to the outer body member to vary the depth of the mold and which contains a shaft extending upward from the centermost portion;
(c) a depth control means extending above said mounting plate and wherein said depth control means contains longitudinal grooves which correspond to the depths that can be selected;
(d) a central shaft disposed within the depth control means and extending from and in communication with the shaft of the dislodging means and wherein said central shaft includes a projection extending outward toward the outer body member and wherein said projection engages said grooves of the depth control means when the central shaft is rotated and adjusts the dislodging plate to the desired depth; and
(e) a depth control selector friction fitted to the uppermost portion of the central shaft and wherein said depth control selector surrounds the depth control means and enables rotation of the central shaft within the depth control means.

4. A food mold for making ice cream sandwiches or the like comprising:

(a) a body having inner walls defining a food molding chamber of uniform cross sectional configuration from top to bottom;

(b) a piston reciprocally mounted in the chamber with a central shaft extending through the top of said body, the piston being of a cross sectional configuration complemental to the cavity so that the piston when in a selected food molding position forms a cavity bottom for food molding and when moved to a food dislodging position is effective to expel a quantity of molded food from the cavity;

(c) a depth controller extending above said body around said central shaft and having a plurality of depth selection grooves;

(d) a depth controller selector operatively connected to said central shaft; and, (e) a projection operatively connected to said central shaft and said depth controller selector, said projection being selectably alignable with at least one of said plurality of depth selection grooves, said piston being selectably positioned within said cavity to a depth commensurate with the length of a selected groove.

5. The mold of claim 4 wherein the complemental surfaces are other than circular to permit the piston and body to be moved relatively reciprocatively and non-rotatably.

6. The mold of claim 4 wherein the complemental surfaces are rectangular.

7. The mold of claim 4 wherein the piston includes a surface defining the bottom of the cavity and that piston surface is generally planar.

8. A food molding and dislodging device comprising:
a body structure defining a mold cavity;
a plate located within said body structure;
a shaft connected to said plate;
a central shaft operatively coupled to the shaft of said plate, said central shaft extending through said body structure, said central shaft having a projection;
a depth control structure connected to said body structure and surrounding said central shaft, said depth control structure having a plurality of depth selection grooves of differing lengths; and,
means to rotate said central shaft to selectively align said projection with a depth selection groove, the volume of said mold cavity being defined by the position of said plate within said mold cavity and being commensurably selectable.

* * * * *